No. 868,617. PATENTED OCT. 15, 1907.
M. SCOZZARI.
MACHINE FOR GRANULATING MAGNESIA.
APPLICATION FILED APR. 16, 1907.

WITNESSES:
Gustave Dieterich
Edwin H...

INVENTOR
Michael Scozzari
BY
Straley & Hasbrouck
his ATTORNEYS

UNITED STATES PATENT OFFICE.

MICHAEL SCOZZARI, OF NEW YORK, N. Y.

MACHINE FOR GRANULATING MAGNESIA.

No. 868,617. Specification of Letters Patent. Patented Oct. 15, 1907.

Application filed April 16, 1907. Serial No. 368,570.

*To all whom it may concern:*

Be it known that I, MICHAEL SCOZZARI, a citizen of the United States, residing at the city of New York, borough of Manhattan, in the county and State of New York, have invented certain new and useful Improvements in Machines for Granulating Magnesia, of which the following is a full, clear, and exact specification.

My invention relates to means for reducing masses of material in solid or semi-solid form into small particles, and the same has for its object more particularly to provide a simple, efficient and reliable machine by means of which magnesia in a pasty or plastic form or mass may be easily and readily granulated or reduced to minute particles.
The machine is to be used more particularly for granulating magnesia and other substances combined with magnesia employed in the manufacture of citrate of magnesia.

Further, said invention has for its object to produce a machine in which the mass to be acted upon is intermittently engaged by the means for spreading and forcing the same through a perforated support, and which at the same time causes the mass of material to be worked and spread upon said support with a step-by-step or successive movement of said spreading and forcing means.

To the attainment of the aforesaid objects and ends my invention consists in the novel details of construction, and in the combination, connection and arrangement of parts hereinafter more fully described, and then pointed out in the claims.

Figure 1:
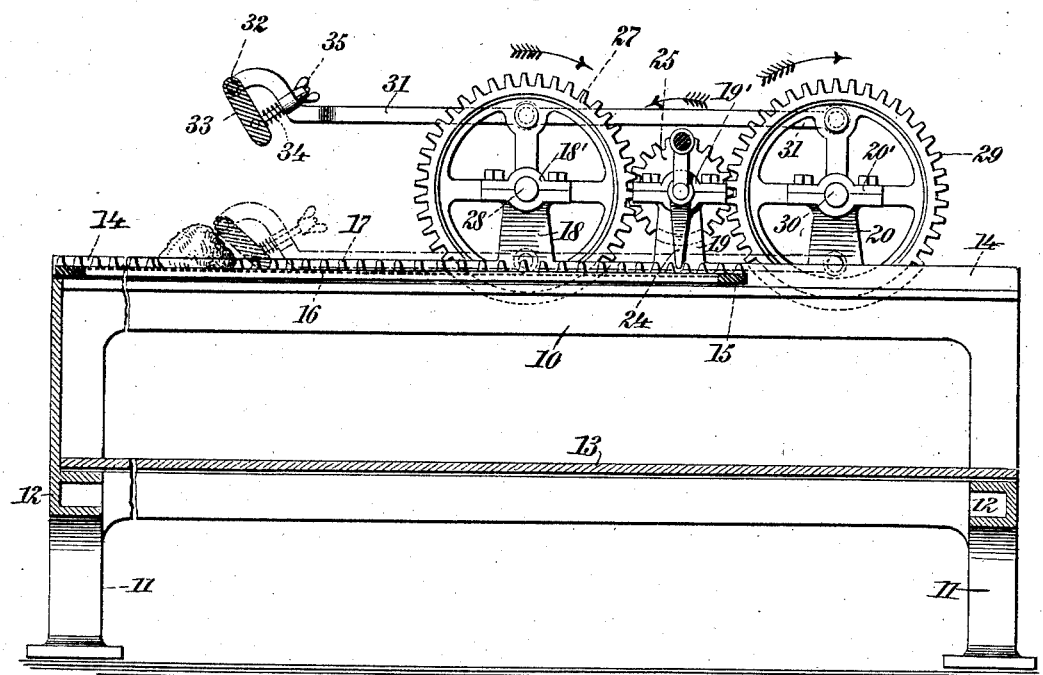
Figure 2:
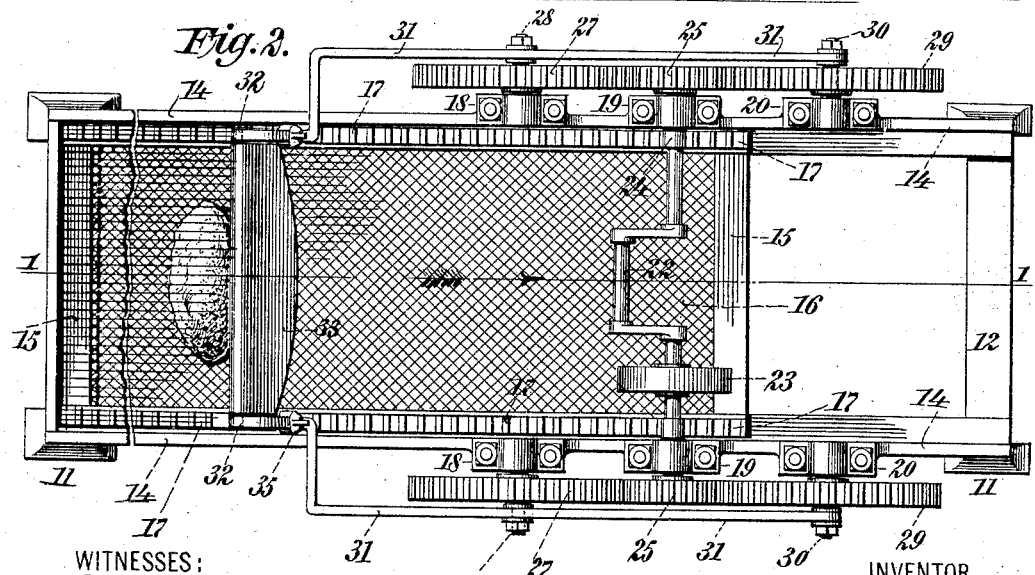

In the accompanying drawings forming part of this specification wherein like numerals of reference indicate like parts, Figure 1 is a central longitudinal section taken on the line 1—1 of Fig. 2, showing a machine constructed according to, and embodying my said invention, and Fig. 2 is a plan or top view thereof.

In said drawings 10 designates a frame having supporting lugs 11, 11 at its ends, and transverse connecting members 12, 12 upon which is supported a horizontal platform 13.

The upper portion of said frame 10 is provided along its longitudinal edges with grooves 14, 14 in which is supported a frame 15 covered with a wire screen 16 of suitable mesh, and 17, 17 denote rack bars secured upon the frame 15 along its longitudinal upper surfaces. Near one end of the frame 10 at its opposite upper edges are arranged vertical standards 18, 18, 19, 19, 20, 20 provided with bearings 18′, 18′, 19′, 19′ and 20′ 20′ respectively. In the bearings 19′, 19′ is mounted a shaft 21 having an operating crank 22 intermediate its ends, a pulley wheel 23 to permit of the machine being operated when desired by power from any suitable source, and adjacent to its opposite ends are fixed projections 24, 24 adapted to engage the teeth of the rack bars 17, 17 of the frame 15, when said shaft 21 is rotated.

Upon the outer ends of the shaft 21 are fixed small gears 25, 25 which mesh with a set of large gears 27, 27, fixed upon short shafts 28, 28, mounted in the bearings 18′, 18′, and with a second set of similar gears 29, 29 fixed upon short shafts 30, 30 mounted in the bearings 20′ 20′.

31, 31 denote rods which are pivotally secured at their ends to outer surfaces of the gears 29, 29, and intermediate their ends to the gears 27, 27. The free ends of said rods are curved upwardly and forwardly in the direction of their length, and secured together at their extremities by a transverse shaft 32 upon which is pivotally secured at its upper edge a spreading blade 33, having its lower curved edge yieldingly supported by means of bolts 34, 34 which are pivotally secured at their lower ends to the lower edge of the blade 33, and have their upper ends passed through apertures in the ends of the rods 31, 31 and provided with adjusting nuts 35, 35 whereby the extent of the movement and the pressure of said blade 33 may be adjusted.

The operation of the machine is as follows: The frame 15 is first adjusted to the position as shown in the drawings, and the mass of magnesia placed therein near its right-hand end as indicated. The machine is then put in operation by rotating the shaft 21 in the direction of the arrow Fig. 1, which will cause the projections 24, 24 to engage the rack bars 17, 17 of the frame 15 and move the same a short distance in the direction of the arrow *a* Fig. 1, and at the same time the rods 31, 31 will be caused to move downwards and towards the right-hand end of the machine during the first half of the revolution of the large gears 27, 29. Just before the completion of the first half of the revolution of said gears 27, 29 the projections 24, 24 will have become released from the rack-bars 17, 17 and the frame 15 come to a stop and held in position by its own weight and friction, and the spreading blade 33 caused to engage the mass of magnesia and spread the same upon the screen 16 and in so doing force a considerable part of the same therethrough, and the particles passing through said screen 16 caused to fall and be retained upon the platform 13. The portion of the material remaining upon the screen 16 will thereupon, during the remaining half of the revolution of the gear 27, 29 be forced forward a short distance, and be again acted upon as above described during the succeeding revolutions, and until the left-hand end of the frame 15 is brought below the spreading blade 33 when the last of the material will have been forced through the screen.

It is to be noted that in the operation of the machine, the frame 15 is only advanced during the period of time that the spreading blade 33 is raised or free of its engagement with the material, and that such times when the blade is in contact with the material upon the screen the latter is at rest.

Having thus described my said invention what I claim and desire to secure by Letters Patent is:

1. A machine of the character described, comprising a frame, a perforated support for the material arranged upon said frame, means for moving said support longitudinally upon said frame, and means for acting upon said material to force the same therethrough during the movement of said support through the machine, substantially as specified.

2. A machine of the character described, comprising a frame, a perforated support for the material mounted to move upon said frame, means for intermittently advancing said support, and means for acting upon said material while said support is at rest, substantially as specified.

3. A machine of the character described comprising a frame, a perforated support for the material mounted to move longitudinally upon said frame, means for advancing said support with a step-by-step movement, a spreading device for pressing the material through said support, and means for actuating said spreading device, substantially as specified.

4. A machine of the character described, comprising a frame, a perforated support for the material mounted to move longitudinally upon said frame, means for advancing said support with a step-by-step movement, a spreading device for pressing the material through said support, and means for actuating said spreading device to press said material through said support while at rest, substantially as specified.

5. A machine of the character described, comprising a frame, a horizontal perforated support for the material, means for advancing said support with a step-by-step movement, a spreading device arranged above said support, means for actuating said spreading device to force a part of the material through said support while forcing a part of said material forward upon said support, substantially as specified.

6. A machine of the character described comprising a frame, a horizontal perforated support for the material arranged to work in said frame, a drive shaft in said frame, means for rotating said drive shaft, means on said drive shaft adapted to engage said perforated support to advance the same during each revolution of said drive shaft, gears on said drive shaft, a plurality of shafts mounted in said frame, gears on said shafts in mesh with the gears on the drive shaft, rods pivotally secured to the gears on the shafts last named, and a blade yieldingly secured to the free ends of said rods, substantially as specified.

7. In a machine of the character described comprising a frame, guides arranged upon said frame, a screen arranged to work in said guides, racks arranged upon said screen along its longitudinal edges, a drive shaft mounted in said frame above said support, means for actuating said shaft, projections fixed upon said shaft adapted to engage the racks on said screen, gears fixed upon the ends of said drive shaft, a pair of gears mounted upon the frame at each side of the gears fixed upon said drive shaft and meshing therewith, a pair of rods each pivotally secured at one end to each of said pair of gears, and a spreading blade pivotally secured at its upper edge to the free ends of said rods, substantially as specified.

8. A machine of the character described comprising a frame, longitudinal guides arranged upon said frame, a screen arranged to work in said guides, racks secured upon said screen along its longitudinal edges, bearings projecting upwardly from said frame, a drive shaft supported in said bearings transversely of the machine, means for rotating said shaft projections fixed upon said drive shaft and adapted to engage the racks on said screen, gears fixed upon the outer ends of said drive shaft, bearings projecting upward from the frame at each side thereof, shafts mounted in said bearings, gears fixed upon said shafts and meshing with the gears on the drive shaft, rods pivotally secured at their ends to the gears arranged at one side of the drive shaft, and pivotally secured intermediate their ends to the gears arranged at the other side of the drive shaft, a blade pivotally supported at its upper edge in the free ends of said rods transversely of the machine, and having its lower edge yieldingly secured to said rods adjacent to their free ends, substantially as specified.

Signed at the city of New York, in the county and State of New York, this second day of April, nineteen hundred and seven.

MICHAEL SCOZZARI.

Witnesses:
CONRAD A. DIETERICH,
A. R. ANGUS.